(12) United States Patent
Takamura et al.

(10) Patent No.: US 7,520,182 B2
(45) Date of Patent: Apr. 21, 2009

(54) TORQUE METER

(75) Inventors: Akio Takamura, Yokohama (JP); Kenichi Otsuka, Yokohama (JP); Tooru Miyata, Yokohama (JP)

(73) Assignee: Ono Sokki Co., Ltd, Kanagawa (JP)

( * ) Notice: Subject to any disclaimer, the term of this patent is extended or adjusted under 35 U.S.C. 154(b) by 71 days.

(21) Appl. No.: 10/588,173

(22) PCT Filed: Feb. 4, 2004

(86) PCT No.: PCT/JP2004/001113

§ 371 (c)(1),
(2), (4) Date: Apr. 19, 2007

(87) PCT Pub. No.: WO2005/075950

PCT Pub. Date: Aug. 18, 2005

(65) Prior Publication Data

US 2007/0180931 A1   Aug. 9, 2007

(51) Int. Cl.
*G01L 3/00* (2006.01)

(52) U.S. Cl. ............................. 73/862.321; 73/862.08

(58) Field of Classification Search .................. 73/1.11, 73/862.08, 862.321, 862.325, 862.337, 862.338
See application file for complete search history.

(56) References Cited

U.S. PATENT DOCUMENTS

| | | | |
|---|---|---|---|
| 2,403,952 A * | 7/1946 | Ruge | 73/862.338 |
| 4,186,596 A | 2/1980 | Bohringer et al. | |
| 4,356,732 A * | 11/1982 | Hachtel et al. | 73/862.331 |
| 4,485,681 A | 12/1984 | Hatamura | |
| 4,503,713 A | 3/1985 | Obayashi et al. | |
| 4,628,745 A | 12/1986 | Hatamura | |
| 4,649,757 A * | 3/1987 | Crespin | 73/862.06 |
| 4,680,976 A * | 7/1987 | Lustenberger | 73/862.331 |
| 4,984,474 A * | 1/1991 | Matsushima et al. | 73/862.325 |
| 5,195,383 A * | 3/1993 | Tanaka et al. | 73/862.325 |
| 5,237,880 A * | 8/1993 | Dobler et al. | 73/862.325 |
| 5,672,834 A * | 9/1997 | Searle et al. | 73/862.338 |
| 5,969,269 A * | 10/1999 | Munyon et al. | 73/862.328 |
| 6,402,196 B1 * | 6/2002 | Nicot | 280/771 |
| 6,517,113 B1 | 2/2003 | Nicot | |
| 7,093,477 B2 * | 8/2006 | Herbold et al. | 73/1.11 |
| 2004/0003646 A1 | 1/2004 | Herbold et al. | |

FOREIGN PATENT DOCUMENTS

| | | |
|---|---|---|
| EP | 1074826 | 2/2001 |
| JP | 53-106181 | 9/1978 |
| JP | 58-088631 | 5/1983 |

(Continued)

*Primary Examiner*—Harshad Patel
*Assistant Examiner*—Freddie Kirkland, III
(74) *Attorney, Agent, or Firm*—Fay Kaplun & Marcin, LLP

(57) ABSTRACT

A torque meter enables highly accurate measurement of a torque by detecting only the torque, without being affected by various loads. The torque meter includes an elastic member placed in a power transmission channel and being deformed upon application with a torque being measured, and a torque detecting arrangement for detecting the torque based on the deformation of the elastic member. The torque member receives a torque being applied to the elastic member, and the load member is provided separately from the torque member, for supporting the load of the elastic member.

8 Claims, 10 Drawing Sheets

FOREIGN PATENT DOCUMENTS

| | | |
|---|---|---|
| JP | 60-038632 | 2/1985 |
| JP | 04-093628 | 3/1992 |
| JP | 10-339678 | 12/1998 |
| JP | 11-264779 | 9/1999 |
| JP | 2002-502760 | 1/2002 |
| JP | 2003-083824 | 3/2003 |

* cited by examiner

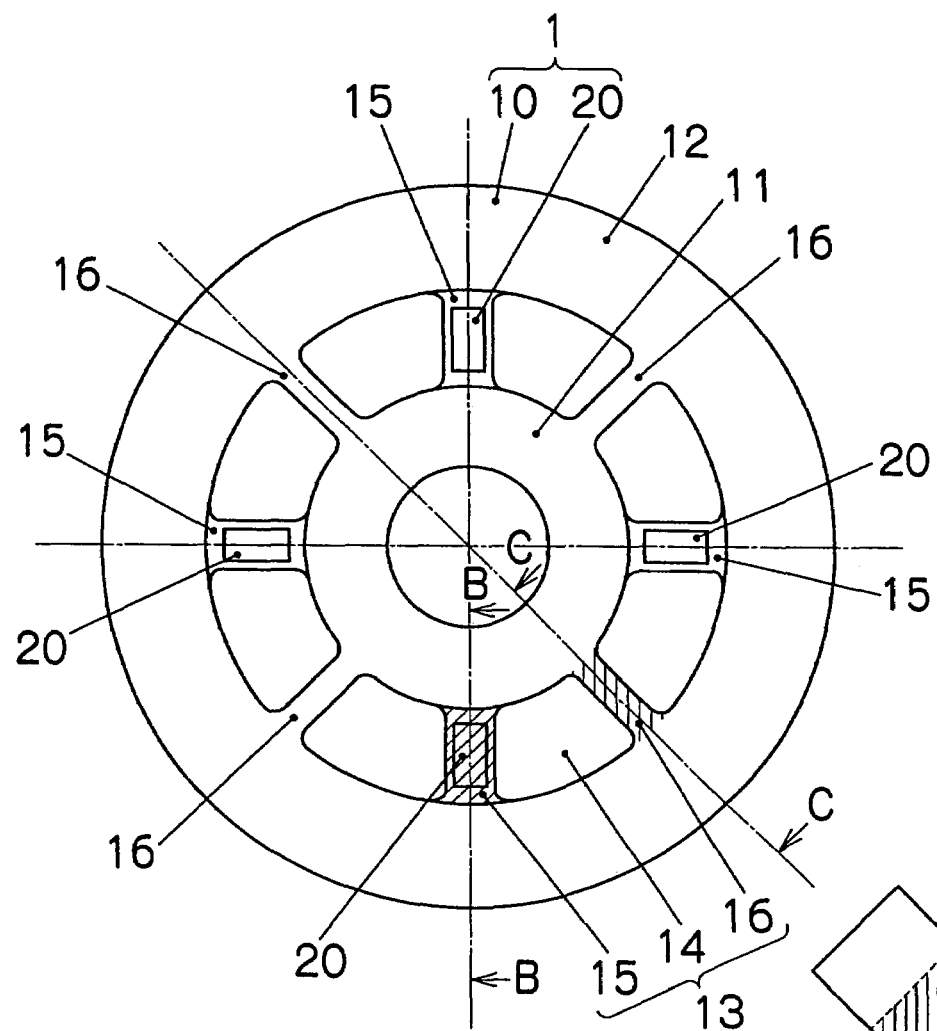
FIG.1A
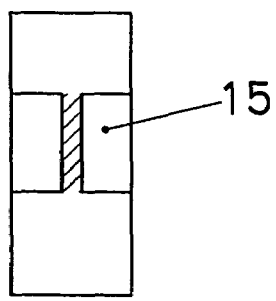
FIG.1B
FIG.1C

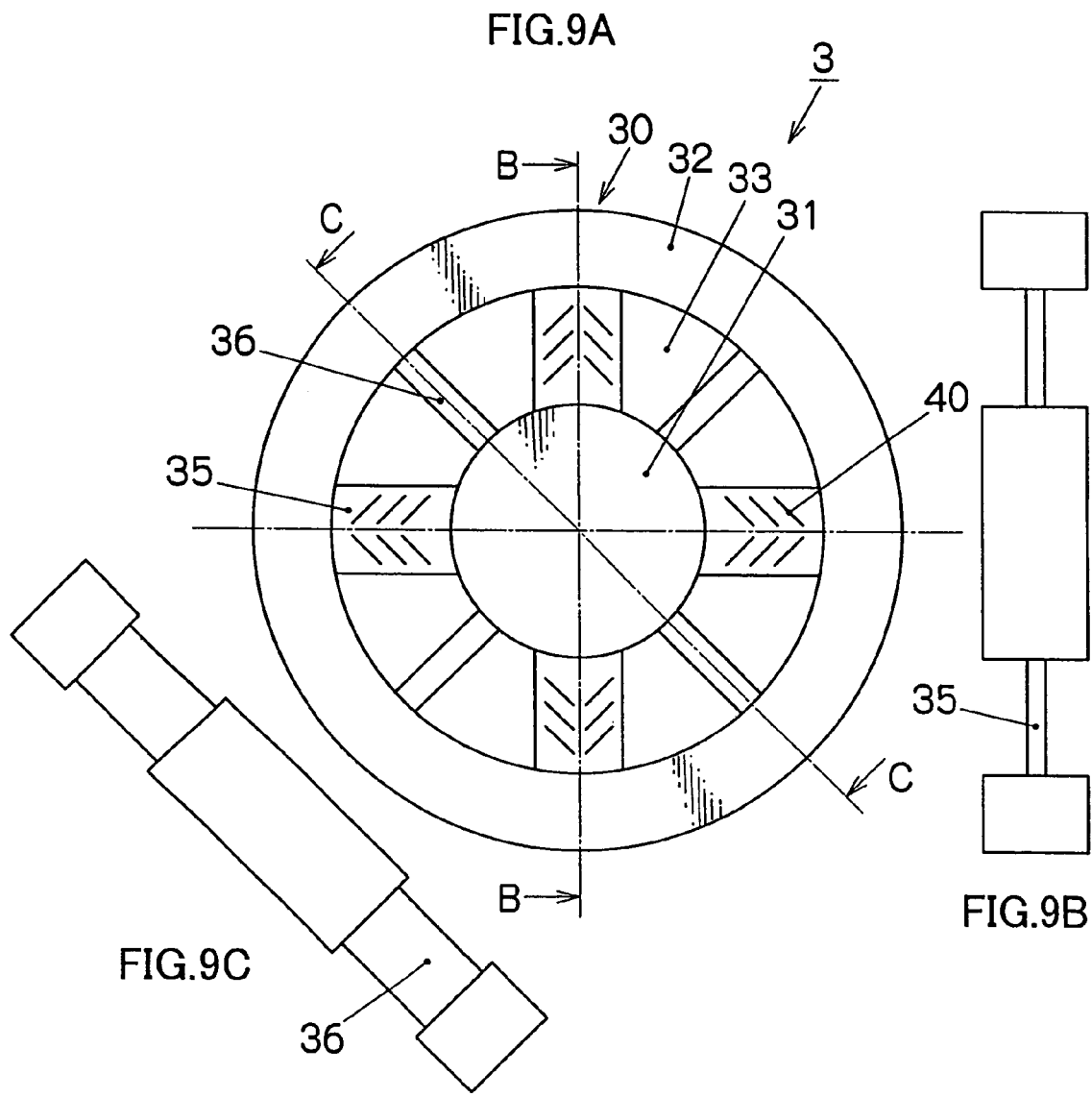

TORQUE METER

TECHNICAL FIELD

The present invention relates to torque meters for measuring a driving torque produced on an output shaft of rotary drive units such as an electric motor and a reduction gear.

BACKGROUND ART

A torque meter of this type serves to measure a moment for a shaft such as a rotary shaft or a stationary shaft as center.

Typically, detection of torque is made by detecting a torsional force of the shaft produced by torque or a torsional angle of the shaft changed by torque. As a means for detecting the torsional force, means is known which uses a piezoelectric element for generating an electric charge proportional to the force received. Moreover, a magnetostrictive element, which is an element using a material having magnetic characteristics that change when subject to a force, serves to detect torque as force. On the other hand, as a means for detecting torsional angle, a distortion-gage system and a rotation pulse phase difference system are well known. It can detect a minute torsional angle of the shaft as a minute displacement.

Japanese Unexamined Patent Application 2003-083824 discloses a torque meter. The torque meter includes a plate-like elastic body mounted between a flange provided to a rotary drive unit and a rotary driven structure, and has a plurality of circular holes formed in a torque transfer area. In the torque transfer area, a flange fixing part arranged around a central through hole and having a fastening means with the flange is connected to a base fixing part arranged outside the flange fixing part and having a fastening means for a fixing base of the rotary driven structure. A distortion gauge is bonded on the interior surface of each circular hole to measure distortion due to torque acting on the torque transfer area, thus detecting a driving torque produced on an output shaft.

However, with the torque meter as shown in Japanese Unexamined Patent Application 2003-083824 the rotary shaft and stationary shaft often undergo, besides the aforementioned moment, loads such as a thrust load (axial-direction load), radial load (radial-direction load), bending load, and centrifugal load at the same time.

Therefore, in order to avoid the influence of forces other than torque, a device is needed to prevent the aforementioned torsional force or torsional angle from being affected by those loads.

In order to prevent the influence of forces other than torque, Japanese Unexamined Patent Application 53-106181 proposes that a plurality of sensors are mounted in the differential-sensor structure for torque detection, in which the sensors are added to increase an output with regard to torque, and the sensors are subtracted to reduce an output with regard to changes other than torque.

However, although Japanese Unexamined Patent Application 53-106181 can reduce the influence other than torque by virtue of the actuation structure, influences due to sensor-to-sensor unbalance, structural unbalance, etc. had to be removed to sufficiently reduce the influence, raising a problem of difficulties in the manufacturing process.

SUMMARY OF THE INVENTION

The present invention relates to a torque meter that allows accurate torque measurement by detecting only torque, without being affected by the aforementioned various loads, ideally, without any influences other than torque.

In order to solve the aforementioned problem, the first aspect of the present invention is a torque meter including an elastic member arranged in a power transmission channel and which deforms in response to torque to be measured, and a torque detection means for detecting the torque based on the deformation of the elastic member, characterized in that it includes a torque member for receiving the torque applied to the elastic member, and a load member arranged separately from the torque member, for supporting a load of the elastic member.

In a second aspect of the torque meter as described in the first aspect of the present invention, characterized in that the elastic member includes an input part, an output part, and a deforming part arranged between said input part and said output part, and that the torque member and the load member are formed with the deforming part.

In a third aspect of the torque meter as described in the first or second aspect of the present invention, characterized in that the elastic member includes a flange-type member, that the torque member and said load member include thin parts formed with said elastic member, that said torque member has a direction of a surface of the thin part positioned parallel to a torque direction, and that said load member has a direction of a thickness of the thin part positioned parallel to the torque direction.

In a fourth aspect of the torque meter as described in the first or second aspect of the present invention, characterized in that the elastic member includes a torsion-bar-type member, that the torque member includes a small-diameter shaft part, and that the load member includes a thin part formed in a radial direction of said small-diameter shaft part and having a direction of a surface positioned in a direction of a torsional moment.

In a fifth aspect of the torque meter as described in the first or second aspect of the present invention, characterized in that the elastic member includes a cylindrical member, that the torque member includes a thin part arranged in a circular-arc direction, and that the load member includes a thin part arranged in a radial direction.

In a sixth aspect of the torque meter as described in any one of the first to fifth aspect of the present inventions, characterized in that the torque detection means are mounted to at least one of the torque member and said load member.

In a seventh aspect of the torque meter as described in any one of the first to sixth aspect of the present inventions, characterized in that the torque detection means uses two or more types of means.

As described above, the present invention produces the following effects:

(1) Due to division into the torque member and the load member, loads other than torque can mainly be supported on the load member, exerting less influence on torque. Therefore, a load resistance of the torque detection means of the same torque sensitivity can be increased.

(2) Since the torque detection means can be mounted to the torque member or a portion other than the torque member, the flexibility of their mounting sites is increased, allowing achievement of the structure that facilitates the manufacture. Moreover, if the torque detection means is mounted to a portion other than the torque member, additional work for reducing variation between the torque members during adjustment becomes easy to carry out, allowing a reduction in unbalance. By mounting the torque detection means to both the torque member and the load member, signals of the latter can be used as torque correction signals, allowing enhancement in accuracy.

(3) Two or more types of torque detection means can be used. The use of a plurality of types of torque detection means allows their switching in accordance with the purpose or computing/mixing of their signals, leading to more accurate correction of the temperature, etc.

BRIEF DESCRIPTION OF THE DRAWINGS

FIGS. 1A, 1B and 1C show an exemplary embodiment 1 of a torque meter according to the present invention;

FIGS. 9A, 9B and 9C show an exemplary embodiment 5 of the torque meter according to the present invention;

PREFERRED MODE FOR CARRYING OUT THE INVENTION

Figure 2A:
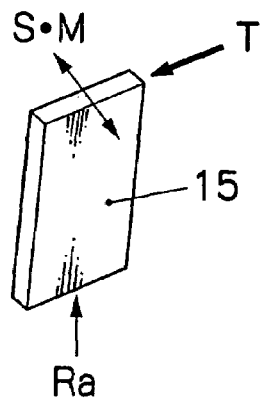
FIGS. 2A and 2B show the direction that a torque member and load member of the torque meter according to the embodiment 1 receive loads.

The present invention relates to detecting torque alone with a high accuracy, and without being affected by various loads by separating a torque member and a load member.

With reference to the drawings, etc., a further detailed description will be made hereafter by giving the embodiments of the present invention.

Exemplary Embodiment 1

FIG. 1A to 1C are views showing embodiment 1 of the torque meter according to the present invention.

A torque meter 1 in the embodiment 1 is arranged in a power transmission channel, and includes an elastic member 10 that deforms in response to a torque to be measured and torque detection means 20 for detecting a torque based on deformation of the elastic member 10.

The elastic member 10 is arranged between a main-body part and a fixing part of a rotary drive unit (not shown). The elastic member 10 is made of a metal such as aluminum, and includes a flange-type member having a specific thickness and upper and lower surfaces arranged parallel to each other.

The elastic member 10 includes a first fixing part (input part) 11 fixed to the main-body part of the rotary drive unit, a second fixing part (output part) 12 fixed to the fixing part of the rotary drive unit, and a deforming part 13 arranged between the first and second fixing parts 11 and 12.

The deforming part 13 is formed with a plurality of (here, eight) holes 14, wherein connections between the holes 14 include a torque member 15 and a load member 16 alternately.

The torque member 15 is a portion for receiving a torque to be applied to the elastic member 10, and includes, as shown in FIG. 1B, a thin part having the surface which is positioned parallel to the torque direction of the elastic member 10.

The load member 16, which is arranged separate from the torque member 15, is a portion for supporting a load of the elastic member 10, and includes a thin part having a direction of a thickness which is positioned parallel to the direction of the torque of the elastic member 10.

In the embodiment 1, each torque detection means 20 is configured by placing a distortion gauge on a torque member 15, and detects a torque with the conventional differential-sensor structure.

The torque detection means 20 such as a distortion gauge or the like are mounted to the torque member 15. Optionally, they may be mounted to portion different from the torque member or may be placed only on some of the torque member 15.

Figure 2B:
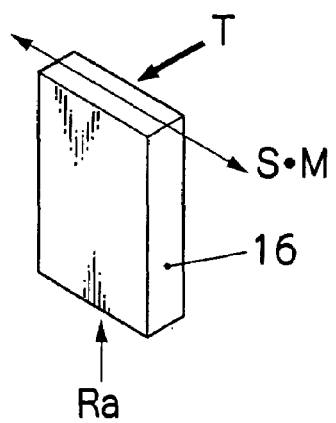

FIGS. 2A and 2B are views showing the direction that the torque member and load member of the torque meter according to the embodiment 1 receive loads. FIG. 3 is a view showing the direction of deformation of the torque member of the torque meter according to the embodiment 1. FIG. 4 is a view showing the direction of deformation of the load member of the torque meter according to the embodiment 1.

Figure 3A:
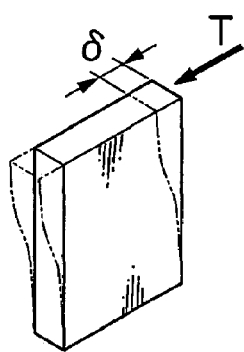
FIGS. 3A, 3B and 3C show the direction of deformation of the torque member of the torque meter according to the embodiment 1.
Figure 3B:
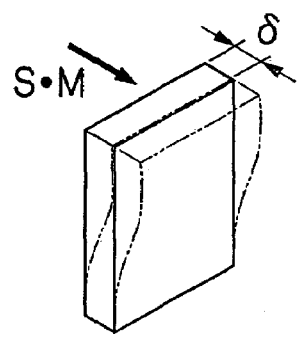
Figure 3C:
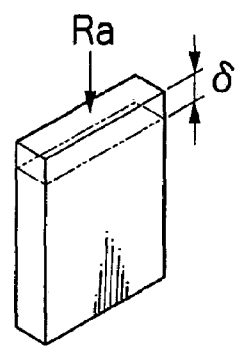

With the torque member 15, since a torque T and a radial load Ra are applied in the surface direction, and a thrust load S and a moment M are applied in the thickness direction as shown in FIG. 2A, deformation due to the torque T is as shown in FIG. 3A, deformation due to the thrust load S and moment M is as shown FIG. 3B, and deformation due to the radial load Ra is as shown in FIG. 3C.

Figure 4A:
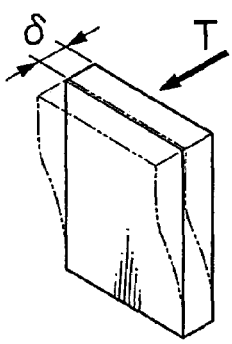
FIGS. 4A, 4B and 4C show the direction of deformation of the load member of the torque meter according to the embodiment 1.
Figure 4B:
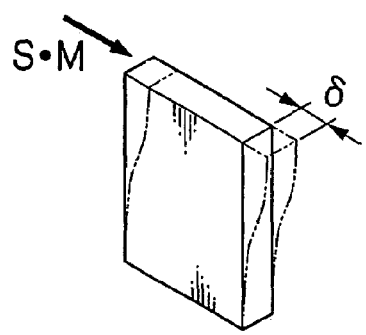
Figure 4C:
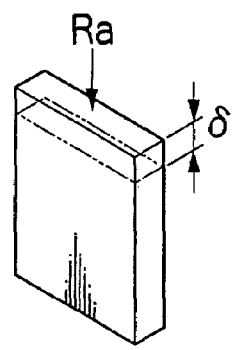

With the load member 16, since the torque T is applied in the direction of thickness and the radial load Ra, thrust load S, and moment M are applied in the direction of surface as shown in FIG. 2B; deformation due to the torque T is as shown in FIG. 4A, deformation due to the thrust load S and moment M is as shown in FIG. 4B, and deformation due to the radial road Ra is as shown in FIG. 4C.

FIG. 5A to 5D are schematic views showing an acting manner of a torque and a load of the torque member and load member of the torque meter according to the embodiment 1.

Assuming that the torque member 15 and load member 16 are rectangular parallelepipeds having the same cross-sectional area and the same length-to-width ratio (suppose that the length-to-width ratio is 1:5, for example), it can be considered that the difference between the torque member 15 and the load member 16 results from the difference in direction of a force received. It is noted that the radial direction is not considered here since the torque member 15 and load member 16 are equal with respect to the radial direction.

Assuming that the rectangular parallelepiped (FIG. 5A) is a beam having both ends fixed, a deflection δ with respect to a load (R) is expressed by the following formula (1):

$$\delta = (L^3/12E) \cdot (1/I) \cdot R \quad (1)$$

Next, a load share ratio is obtained between the torque member 15 and the load member 16.

When the torque member 15 and load member 16 exist simultaneously, deflections when applying loads are the same. Assuming that loads shared at that time are R1 and R2, the following formula (2) is formed:

$$(L^3/12E) \cdot (1/I1) \cdot R1 = (L^3/12E) \cdot (1/I2) \cdot R2 \quad (2)$$

If E and L are the same, it is expressed by the following formula (3):

$$(I2/I1)=(R2/R1) \tag{3}$$

Figure 5A:
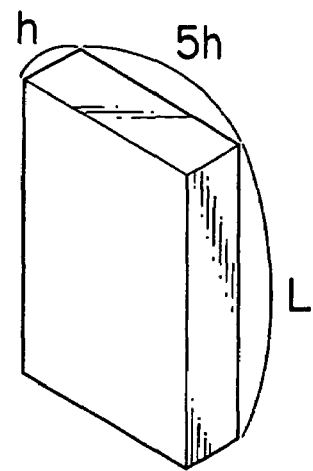
FIGS. 5A, 5B, 5C and 5D show an acting manner of a torque and a load in the torque member and load member of the torque meter according to the embodiment 1.
Figure 5B:
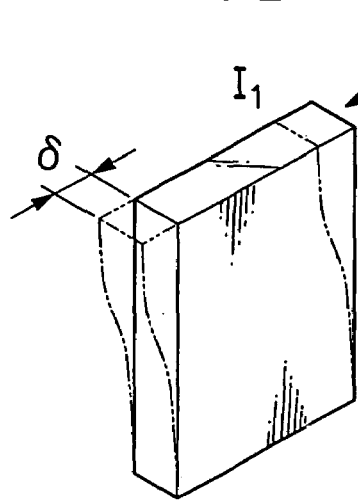
Figure 5C:
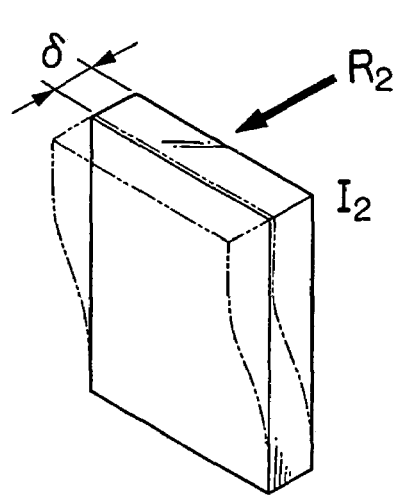
Figure 5D:
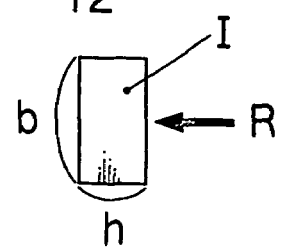

Here, since consideration is made with regard to the rectangular parallelepiped having 1:5 length-to-width ratio as shown in FIG. 5D, a secondary sectional moment is expressed by $I-(1/12)$ $bh^3$, and consequently:

$$I1=(1/12)h\cdot(5h)^3=(1/12)\cdot125h^4 \tag{4}$$

$$I2=(1/12)5h\cdot(h)^3=(1/12)\cdot5h^4 \tag{5}$$

$$(R2/R1)=(I2/I1)=(1/25) \tag{6}$$

In the aforementioned example, the torque member 15 shares a torque corresponding load 25 times greater than the load member 16. Therefore, an internal stress occurs, allowing measurement of distortion with excellent sensitivity.

On the other hand, as for a thrust load and moment, contrary to torque, the torque member 15 shares 1/25 (ratio of a secondary sectional moment) of a load of the load member 16.

As described above, the torque meter 1 in the embodiment 1 allows intentional selection of a force to be received by suitably aligning the sectional shapes of the torque member 15 and load member 16 in the load direction. Thus, after suitably aligning the torque member 15, the load member can appropriately be positioned in accordance with other load capabilities as required.

Therefore, loads other than torque can mainly be supported on the load member 16, exerting less influence on torque. Therefore, a load resistance of the torque detection means 20 of the same torque sensitivity can be increased.

Specifically, in addition to the actuation-sensor structure, the torque meter 1 is configured by structurally separating the torque member 15 that is a member for receiving a torque and other member such as load member 16 that is a member for receiving a load, supporting loads separately from a torque. Thus, their influences on torque can further be reduced.

Moreover, by separating the torque member 15 and the load member 16, an influence of loads can be reduced, allowing increase in load rigidity only, without changing the torsional amount (without changing the sensitivity with respect to torque).

Exemplary Embodiment 2

Figure 6:
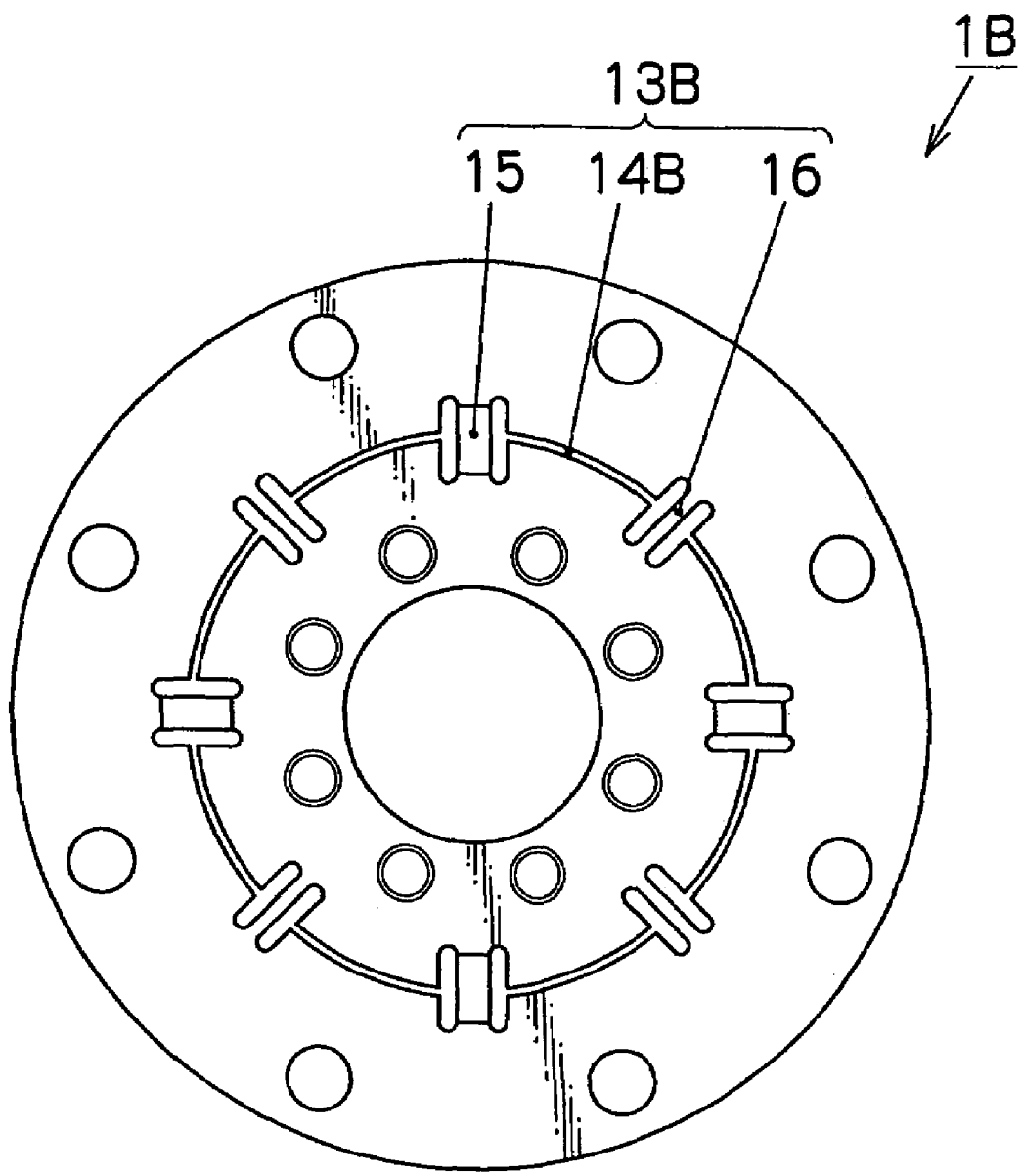
FIG. 6 shows an exemplary embodiment 2 of the torque meter according to the present invention.

FIG. 6 is a view showing embodiment 2 of the torque meter according to the present invention.

It is to be noted that, in the embodiments depicted below, the same numerals or the unified end numerals are given to the parts that fulfill the same function as in the embodiment 1 described above, and an overlapping description and drawings are omitted as appropriate.

With a torque meter 1B in the embodiment 2, a deforming part 13B is formed with eight grooves 14B, wherein connections between the grooves 14B include torque member 15 and load member 16 alternately.

According to the embodiment 2, even if the torque member 15 and the load member 16 are broken, the groove structures 14B will serve as a guide so that an effect of reducing danger and damage can be expected. Moreover, by changing the holes 14 in the embodiment 1 to the structure of the grooves 14B in the embodiment 2, the execution methods can also be changed, which can be selected as appropriate.

Exemplary Embodiment 3

Figure 7:
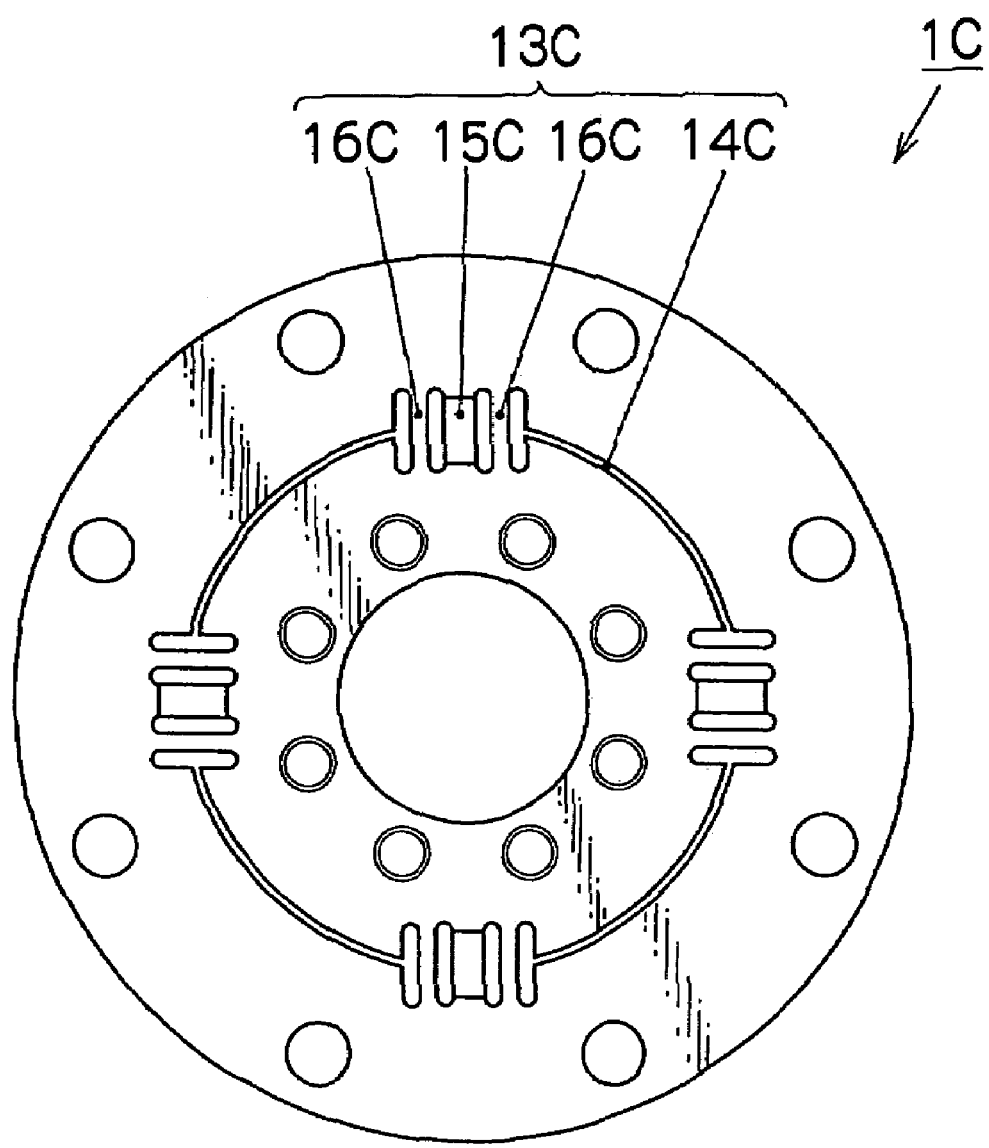
FIG. 7 shows an exemplary embodiment 3 of the torque meter according to the present invention.

FIG. 7 is a view showing embodiment 3 of the torque meter according to the present invention.

With a torque meter 1C in the embodiment 3, a deforming part 13C is formed with four grooves 14C, in which connections between the grooves 14C include two load members 16C and 16C and one torque member 15C held therebetween.

In such a manner, the number of torque members and load members may be different. Specifically, according to the embodiment 3, the number of load members can be selected in accordance with the magnitude of loads other than torque.

Exemplary Embodiment 4

Figure 8:
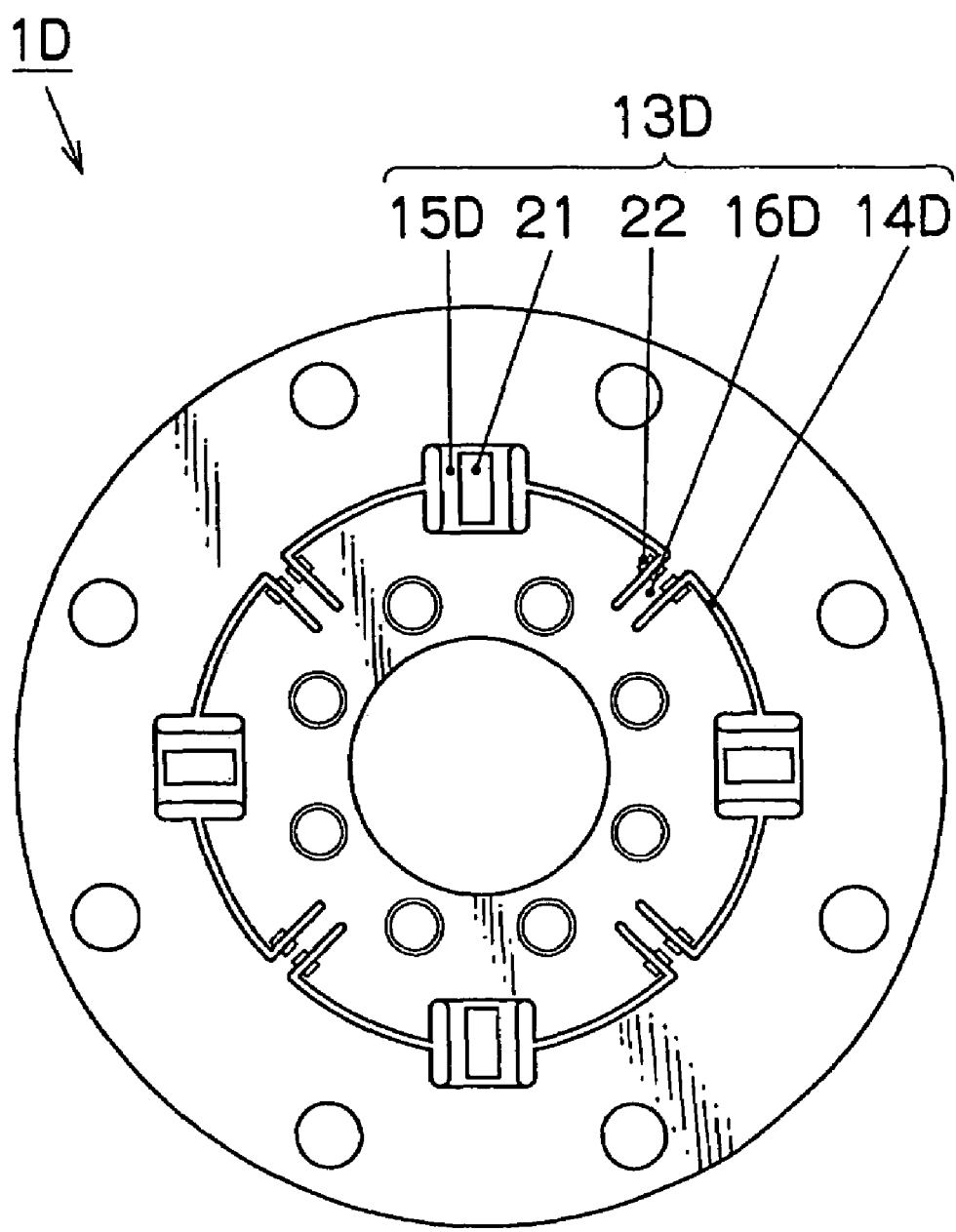
FIG. 8 shows an exemplary embodiment 4 of the torque meter according to the present invention.

FIG. 8 is a view showing embodiment 4 of the torque meter according to the present invention.

With a torque meter 1D in the embodiment 4, a deforming part 13D is formed with eight grooves 14D, wherein connections between the grooves 14D include a torque member 15D and a load member 16D alternately.

In this embodiment 4, torque detection means 21 and 22, which are different, are further provided to the torque member 15D and the load member 16D.

Using a distortion gauge as the torque detection means 21 and a capacitance-type sensor of excellent responsivity as the torque detection means 22, for example, signals of any one of the sensors can be used in accordance with the purpose. Specifically, the torque detection means can be selected as appropriate in accordance with the use. For example, when the responsiveness is required, in contrast the stability (noise and temperature characteristics) is not so required, or when the responsiveness is not so required, in contrast the stability is required.

In the embodiment 4, the torque detection means 21 and 22 are mounted to both the torque member 15D and the load member 16D to thereby allow the use of signals of the latter as torque correction signals, leading to a possible enhancement in accuracy.

Exemplary Embodiment 5

FIG. 9A to 9C are views showing embodiment 5 of the torque meter according to the present invention.

A torque meter 3 in the embodiment 5 includes a flange-type elastic member 30 arranged in the power transmission channel and which deforms in response to a torque to be measured.

The elastic member 30 is made of metal such as aluminum, and includes a wheel-like member having a predetermined thickness and upper and lower surfaces arranged parallel to each other.

The elastic member 30 includes a first fixing part (input shaft) 31 fixed to a main-body part of the rotary drive unit, a second fixing part (output shaft) 32 fixed to the stationary part of the rotary drive unit, and a deforming part 33 arranged between the first and second fixing parts 31 and 32.

In the embodiment 5, the deforming part 33 includes a torque member 35 and a load member 36 arranged alternately in a spoke-like manner.

The torque member 35 include, as shown in FIG. 9B, a thin part having the direction of the surface which is positioned parallel to the torque direction of the elastic member 30. The load member 36 includes, as shown in FIG. 9C, a thin part having the direction of the thickness which is positioned parallel to the torque direction. Torque detection means 40 include a distortion gauge placed on the torque member 35.

Exemplary Embodiment 6

Figure 10B:
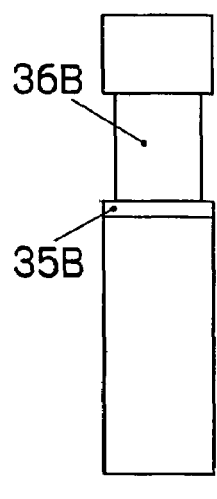
FIGS. 10A and 10B show an exemplary embodiment 6 of the torque meter according to the present invention.
Figure 10A:
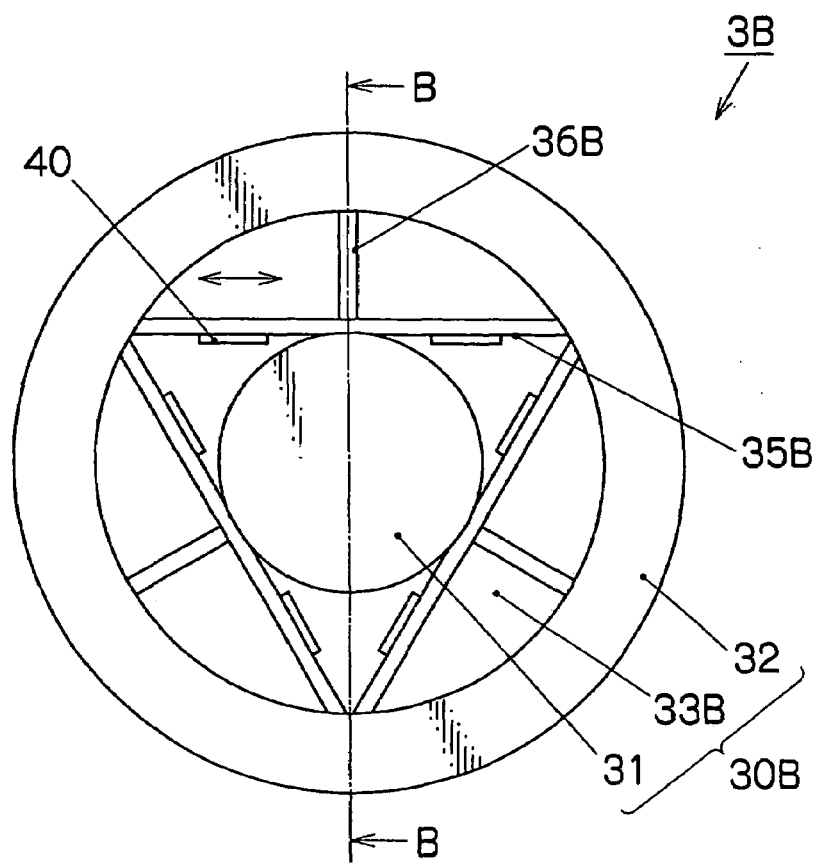

FIGS. 10A and 10B are views showing embodiment 6 of the torque meter according to the present invention.

A torque meter 3B in the embodiment 6 is similar to that in the embodiment 5 in that a deforming part 33B of a flange-type elastic member 30B connects a first fixing part 31 to a second fixing part 32 by a torque member 35B and a load member 36B.

However, the torque member 35B includes, as shown in FIG. 10B, three thin parts arranged in the tangential direction of the first fixing part 31. The load member 36B includes three thin parts arranged in the radial direction of the first fixing part 31. The torque detection means 40 include a distortion gauge placed on the torque member 35B.

Exemplary Embodiment 7

Figure 11A:
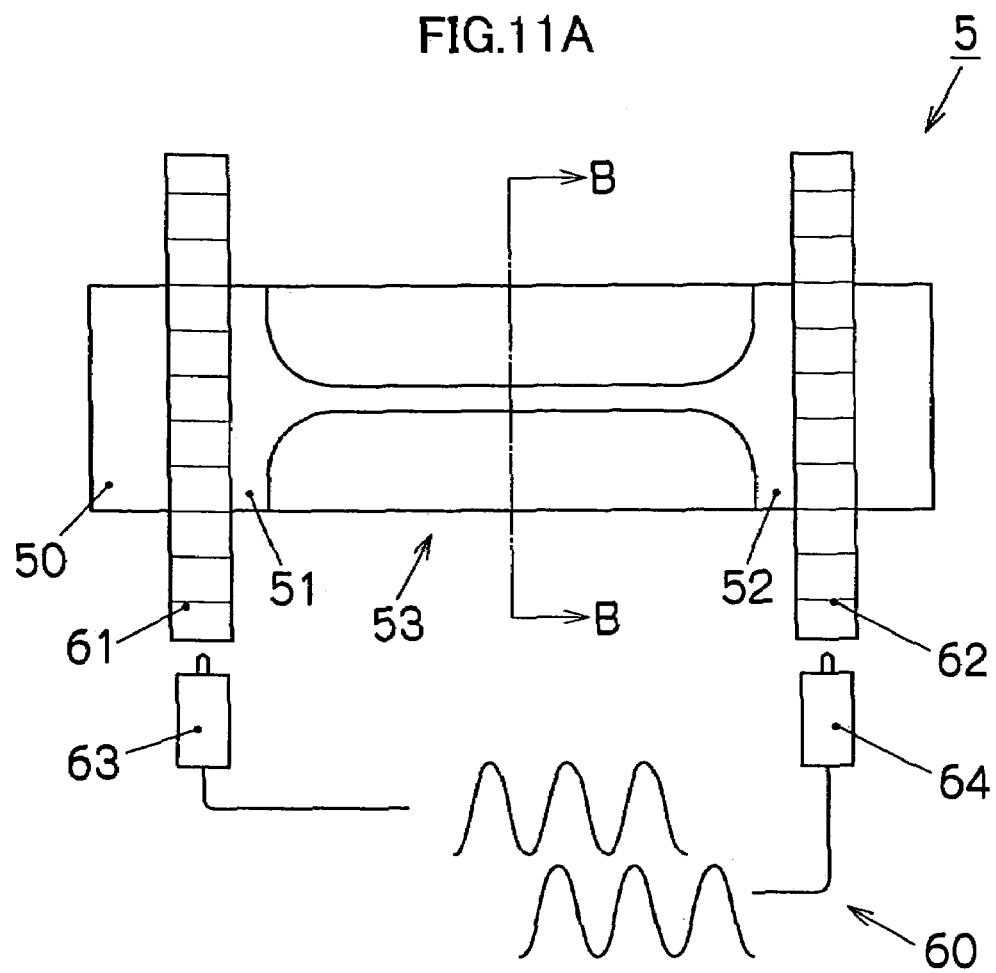
FIGS. 11A and 11B show an exemplary embodiment 7 of the torque meter according to the present invention.
Figure 11B:
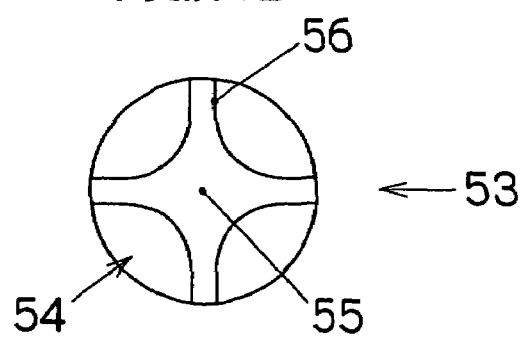

FIGS. 11A and 11B are views showing embodiment 7 of the torque meter according to the present invention.

A torque meter 5 in the embodiment 7 is arranged in the power transmission channel, and includes a torsion-bar-type elastic member 50 that deforms in response to a torque to be measured.

The elastic member 50 is made of metal such as aluminum, and includes a shaft member having a predetermined diameter. The elastic member 50 includes, as shown in FIG. 11A, a first fixing part (input shaft) 51, a second fixing part (output shaft) 52, and a deforming part 53 arranged between the first and second fixing parts 51 and 52.

In the embodiment 7, the deforming part 53 is formed with four cuts 54 as shown in FIG. 11B. A torque member 55 includes a small-diameter shaft part. A load member 56 includes a thin part arranged in the radial direction of the torque member 55 and having the direction of the thickness which is positioned parallel to the direction of torque.

Torque detection means 60 are configured to detect encoder disks 61 and 62 arranged at the input and output of the elastic member 50 through non-contact sensors 63 and 64.

Exemplary Embodiment 8

Figure 12A:
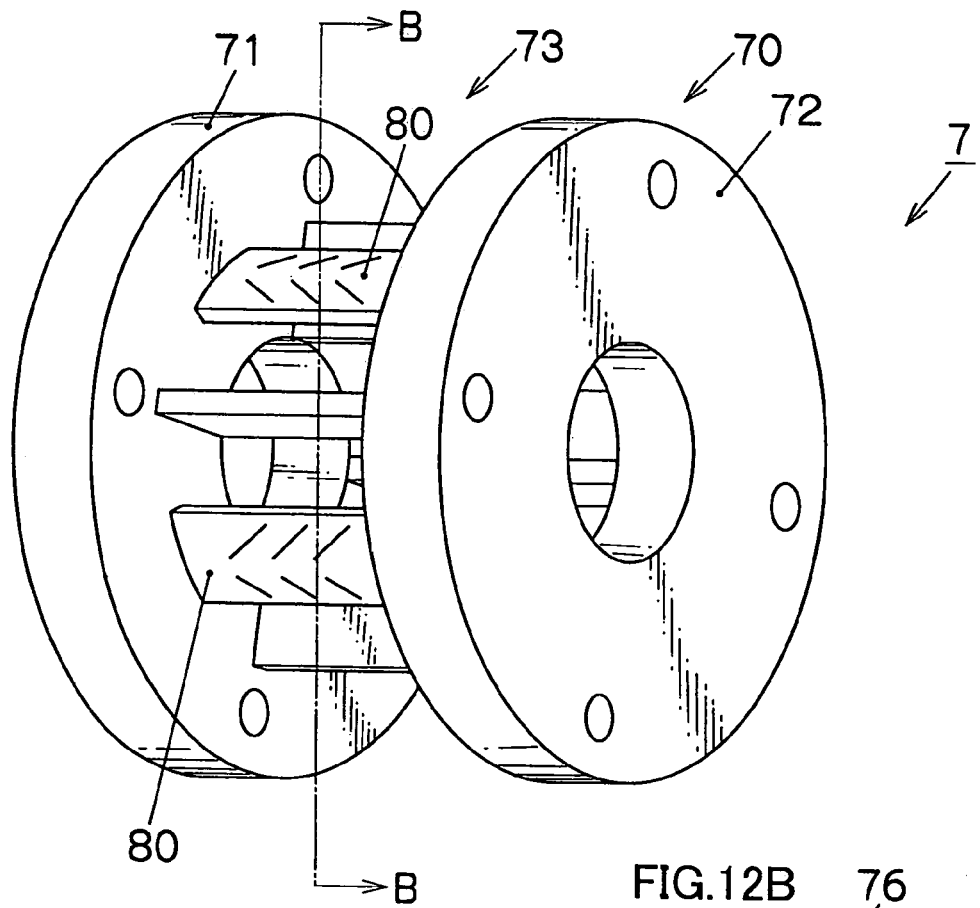
FIGS. 12A and 12B show an exemplary embodiment 8 of the torque meter according to the present invention.
Figure 12B:
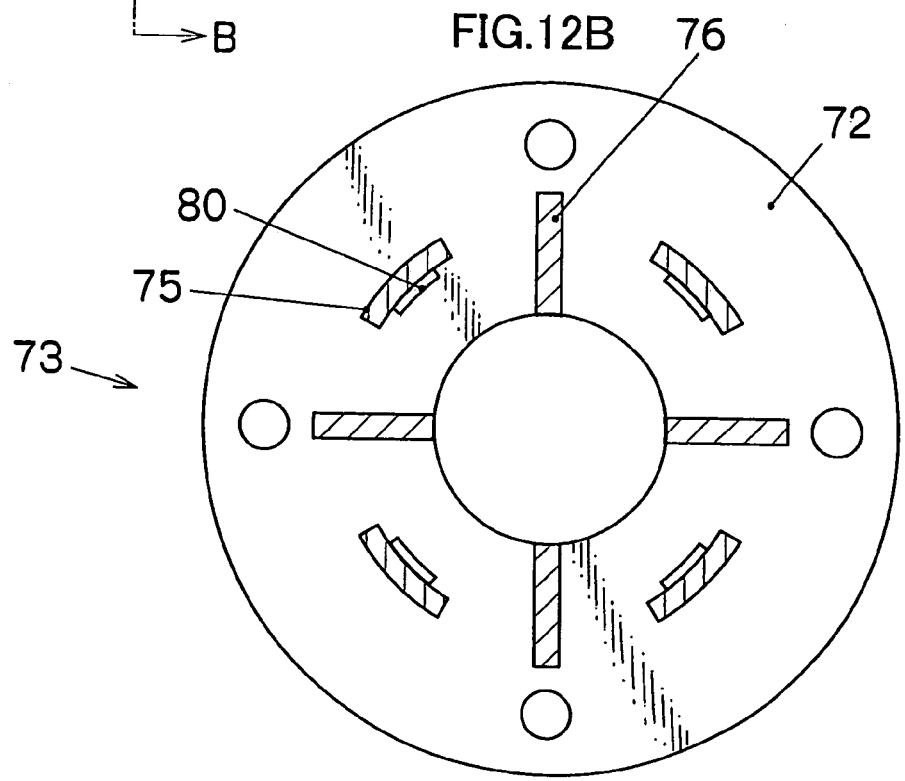

FIGS. 12A and 12B are views showing embodiment 8 of the torque meter according to the present invention.

A torque meter 7 in the embodiment 8 is arranged in the power transmission channel, and includes a cylindrical elastic member 70 that deforms in response to a torque to be measured.

The elastic member 70 includes, as shown in FIG. 12A, a disk-like first fixing part (input shaft) 71, a disk-like second fixing part (output shaft) 72, and a deforming part 73 arranged between the first and second fixing parts 71 and 72.

With the deforming part 73 in the embodiment 8, as shown in FIG. 12B, a torque member 75 includes four thin parts that are sections of a cylinder. A load member 76 includes a small-thickness part arranged in the radial direction.

Torque detection means 80 include a distortion gauge placed on the torque member 75.

The embodiments 5 to 8 have manufacturing and working methods that vary in accordance with the difference in structure, and thus can be selected as appropriate in consideration of performance, cost, etc. By way of example, the embodiment 7 allows a reduction in shaft outer diameter in terms of the structure and thus a reduction in moment of inertia, providing availability when intending to reduce an influence of a moment of inertia.

Variation

Without being limited to the embodiments as described above, various changes and modifications are possible, which are also within the scope of equivalents of the present invention.

(1) The number of torque members and that of load members may be identical or different.

(2) The torque member and the load member may be connected or may not be connected. Moreover, the torque member and the load member may not be paired.

(3) There may provide a plurality of torque detection means or a plurality of types of torque detection means. Moreover, the torque detection means may have a load sensor to use its signals as correction signals.

The invention claimed is:

1. A torque meter, comprising:
    an elastic member arranged in a power transmission channel and deforming in response to a torque to be measured;
    a torque detection arrangement detecting the torque based on deformation of the elastic member;
    a torque member receiving the torque applied to the elastic member; and
    a load member arranged separate from the torque member, the load member supporting a load of the elastic member,
    wherein the torque member and the load member are thin parts formed of the elastic member,
    wherein a thin part serving as a torque member is arranged such that an in-plane direction of the thin part is parallel to a direction of the torque,
    wherein a thin part serving as a load member is arranged such that a direction of a thickness of the thin part is parallel to the direction of the torque, and
    wherein the torque detection arrangement is mounted to each of the torque member and the load member.

2. The torque meter according to claim 1, wherein the torque detection arrangement uses at least two types of torque detection arrangements.

3. A torque meter, comprising:
    an elastic member arranged in a power transmission channel and deforming in response to a torque to be measured;
    a torque detection arrangement detecting the torque based on deformation of the elastic member;
    a torque member receiving the torque applied to the elastic member; and
    a load member arranged separate from the torque member, the load member supporting a load of the elastic member;
    wherein the elastic member is a torsion bar,
    wherein the torque member is shaped as a shaft axially extending in a central portion of the torsion bar,
    wherein the shaft has a diameter smaller than that of the torsion bar, and
    wherein the load member is a thin part formed around the torque member in a radial direction thereof and arranged such that an out-of-plane direction of the thin part lies in a direction of a torsional moment.

4. The torque meter according to claim 3, wherein the torque detection arrangement is mounted to at least one of the torque member and the load member.

5. The torque meter according to claim 3, wherein the torque detection arrangement uses at least two types of torque detection arrangements.

6. A torque meter, comprising:
an elastic member arranged in a power transmission channel and deforming in a response to a torque to be measured, wherein the elastic member is cylindrical and includes a pair of disks;
a torque detection arrangement detecting the torque based on deformation of the elastic member;
a torque member that connects the pair of disks and receives the torque applied to the elastic member; and
a load member that is arranged separate from the torque member to connect the pair of disks, the load member supporting a load of the elastic member;
wherein the torque member is a thin part that is a section of a cylinder arranged in a circular-arc direction, and
wherein the load member is a thin part arranged in a radial direction.

7. The torque meter according to claim 6, wherein the torque detection arrangement is mounted to at least one of the torque member and the load member.

8. The torque meter according to claim 6, wherein the torque detection arrangements uses at least two types of torque detection arrangements.

* * * * *